United States Patent [19]

Juravic, Jr.

[11] Patent Number: 4,761,553
[45] Date of Patent: Aug. 2, 1988

[54] GASEOUS LEAK DETECTOR

[75] Inventor: Frank E. Juravic, Jr., Aurora, Ill.

[73] Assignee: The United States of America as represented by the United States Department of Energy, Washington, D.C.

[21] Appl. No.: 539,369

[22] Filed: Oct. 6, 1983

[51] Int. Cl.⁴ .............................................. H01J 49/30
[52] U.S. Cl. ................................... 250/298; 250/294; 250/281
[58] Field of Search ............... 250/298, 294, 282, 281; 73/40.7

[56] References Cited

FOREIGN PATENT DOCUMENTS 1280011 7/1972 United Kingdom ............... 250/298

Primary Examiner—Bruce C. Anderson
Assistant Examiner—Jack I. Berman
Attorney, Agent, or Firm—Bruce Mansfield; John M. Albrecht; Judson R. Hightower

[57] ABSTRACT

In a short path length mass-spectrometer type of helium leak detector wherein the helium trace gas is ionized, accelerated and deflected onto a particle counter, an arrangement is provided for converting the detector to neon leak detection. The magnetic field of the deflection system is lowered so as to bring the non linear fringe area of the magnetic field across the ion path, thereby increasing the amount of deflection of the heavier neon ions.

8 Claims, 5 Drawing Sheets

GASEOUS LEAK DETECTOR

CONTRACTUAL ORIGIN OF THE INVENTION

The United States Government has rights in this invention pursuant to Contract No. DE-AC02-76CH03000 between the U.S. Department of Energy and Universities Research Association, Inc., operator of Fermi National Accelerator Laboratory.

BACKGROUND OF THE INVENTION

This invention pertains to improved leak detectors of the mass spectrometer type, and in particular neon gas leak detectors.

Instruments for detecting trace amounts of a leak gas in the presence of one or more background gases are well known. Frequently, it is desirable from a cost and maintenance standpoint, to convert leak detection instruments so that they can read gases which differ from those gases that the instrument was designed to detect. This conversion process is not always a straightforward one. For example, in the mass-spectrometer type of gaseous leak detector, the well known equation for the radius of internal trajectory of the detected gas, $$r = \frac{K}{B} \times \sqrt{\frac{mv}{e}}$$

is not in itself sufficient to assure adequate particle collection rates in a modified detector. If, for example one wished to use a helium gas leak detector to measure neon gas, (which has a larger mass, 20 mass units, as opposed to the four mass units of helium) the controllable operating parameters of the instrument (referred to in the preceeding equation) are the magnetic field strength, B (in $10^{-4}$ gauss), and accelerating voltage v (in volts), assuming a given instrument having a fixed, defined radius r (in meters). The proportionality constant K and electronic charge e (in coulombs) are not controllable. Thus, for an existing instrument, i.e., an instrument of fixed particle trajectory radius r, a change in mass m is typically compensated for by a change in magnetic field B, or accelerating voltage v or both. However, the theory of detector operation is often inadequate to produce a successful conversion for a given practical instrument; for example, the converted instrument might not provide adequate particle collection rates.

It is therefore an object of the present invention to provide an inexpensive arrangement for converting a helium gas leak detector to a neon gas leak detector.

It is another object of the present invention to provide a conversion arrangement having improved detectedparticle collection efficiencies.

Another object of the present invention is to provide a conversion arrangement that requires a minimum modification to existing equipment.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

These and other objects of the present invention are provided for an improvement in a fixed-focus mass-spectrometer type of helium gas leak detector, i.e., an instrument wherein particles not of interest (of masses other than mass for which the unit was designed) are deflected so as to fall on either side of a collector, or particle counter. Such instruments have an ionization cell (if neutral species are to be detected), a particle accelerator for projecting the ions in a predetermined direction, and a magnet having spaced-apart pole pieces positioned on either side of the ion path to deflect the accelerated particles so as to sort them according to mass. The instrument also includes a series of baffles which define a trajectory path between the particle accelerator and collector portions of the instrument. The baffles serve to deflect particles of masses which vary widely from that of the mass of the design gas. Particles more closely approaching the mass of the design gas clear some or even all portions of the baffle configuration (i.e., the radial trajectory path), but fall on either side of the target collector, with the lighter particles falling short of the target, and heavier particles falling beyond the target. If an instrument provides the necessary selectivity or mass resolution required for accurate operation, only particles having a mass value of the design gas impinge upon the particle collector. Mass collection rates of instruments modified according to the present invention have upper limit collection currents as large as $1 \times 10^{-14}$ amps.

The present invention is directed to the conversion of short (less than 12 cm) path length instruments which require a highly accurate alignment of path-defining components, if minimum usable particle collection rates are to be obtained. According to the present invention, short path-length mass-4 instruments are adapted for mass-20 gas detection by distorting the magnetic deflection field which intersects the trajectory path, such that non-parallel lines of magnetic force act upon accelerated particles in the path, so as to alter the original path shape of the accelerated-ion path. In close tolerance detectors of the short path-length type, this results in a distorted trajectory for mass-20 particles, one which departs from a circular shape. If necessary, due to limited space available for a required stronger magnet, a less-than-ideal-strength magnet may be employed, but the accelerating voltage must be appropriately reduced (using the aforementioned equation, for example). According to the present invention, collection rates of $10^{-14}$ amperes are obtained.

BRIEF DESCRIPTION OF THE DRAWINGS

In the drawings, wherein like elements are referenced alike.

DETAILED DESCRIPTION OF THE PREFERRED EMBODIMENT

Figure 1:
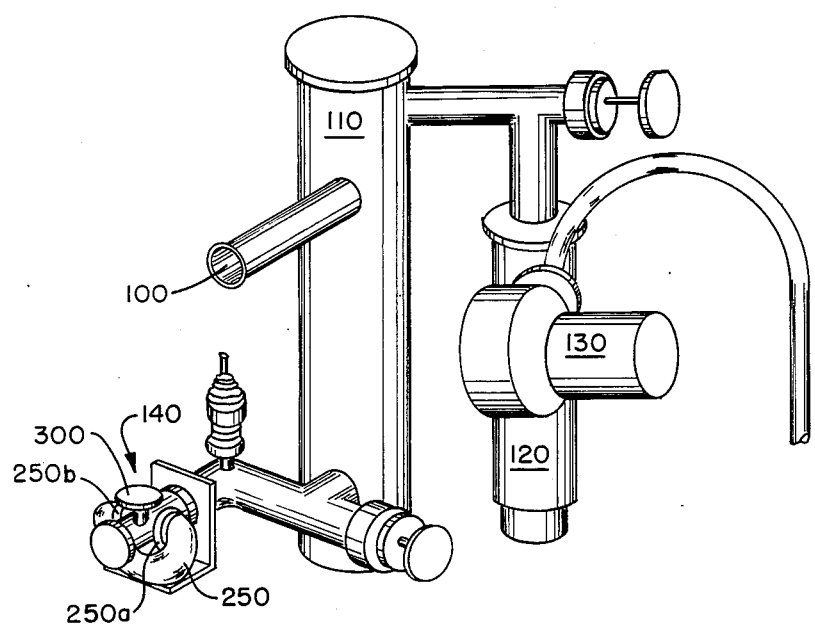
FIG. 1 is a perspective view of a leak detector.

Among gaseous particle detectors having a given mass value, voltage, magnetic field strength, and collector size, detectors having a relatively short path length between the particle accelerator and collector members require a more accurate alignment of the deflection pathdefining components. In shorter path-length mass spectrometer instruments, the collector is positioned closer to the accelerating electrodes—hence the beam is more dense (i.e., has less diversion), but presents a relatively small target for a fixed-size collector. As a result, adequate particle collection rates are more difficult to obtain in short path-length instruments.

The present invention is particularly directed to short path-length machines, wherein the path length between particle accelerator and particle collector portions lies in the range of 3.9 to 11.8 centimeters. In these devices, successful practical operation lies in the accurate setting of particle path determinants, especially accelerating voltage and magnetic field strength parameters. In a practical field environment, it is often difficult to readily determine the required voltage and magnetic field strength for a given instrument, when the instrument is set up for detection of particles having masses lying within the design range of the instrument. It is still more difficult to convert a short path length instrument to detect particles having a mass lying well outside the design range of the instrument. In the preferred embodiment of the present invention, a five-fold difference in mass value i.e., from mass-4 to mass-20 is accomplished in the instrument conversion. The well-known approximate equation $$r = \frac{K}{B} \times \sqrt{\frac{mv}{e}}$$

can at times be utilized to predict the success operating parameters of an instrument which are required for an attendant change in detected particle mass. Instrument modifications based on this straight-forward approach are well known in the art. However, this approach, when applied to a specific instrument, the DuPont Model 120 SSA/24-120 leak detector employing a DuPont Diatron -4 Analyzer Module, was not successful when used to detect mass-20 particles. The unsuccessful attempt to convert from mass-4 to mass-20 particle detection included increasing the magnetic field, and in reducing the accelerating voltage. Indeed, two years of efforts by an experienced team at the Fermi National Accelerator Laboratory in Batavia, Illinois failed to produce a DuPont Diatron-4 arrangement that could detect mass-20 particles at usable minimum collection rates. It should be remembered throughout this description however, that the Diatron-4 module is a short path length mass analyzer designed for mass-4 particle detection only.

Despite cost and maintenance incentives, Fermi National Accelerator Laboratory, and other end-users of the DuPont leak detector could not produce an arrangement wherein the DuPont Diatron-4 unit could detect mass-20 particles at usable minimum collection rates. According to the present invention, however, a leak detector utilizing the DuPont Diatron-4 module detected mass-20 particles with a sensitivity of $2 \times 10^{-9}$ atm-cc/sec/div, with collector currents at least as great as $1 \times 10^{-14}$ amperes, based on tests using a standard neon leak gas, which will be explained below. Besides rendering the leak detector arrangement operable so as to detect mass-20 ions, the present invention provides an unexpected ten-fold improvement in neon (i.e., mass-20) detecting sensitivity over the closest known alternative, the more costly DuPont Diatron-20C (permitting three-gas detection of neon, argon as well as helium) which has a nominal sensitivity of $2 \times 10^{-8}$ atm/cc/sec/div for neon.

Figure 2:
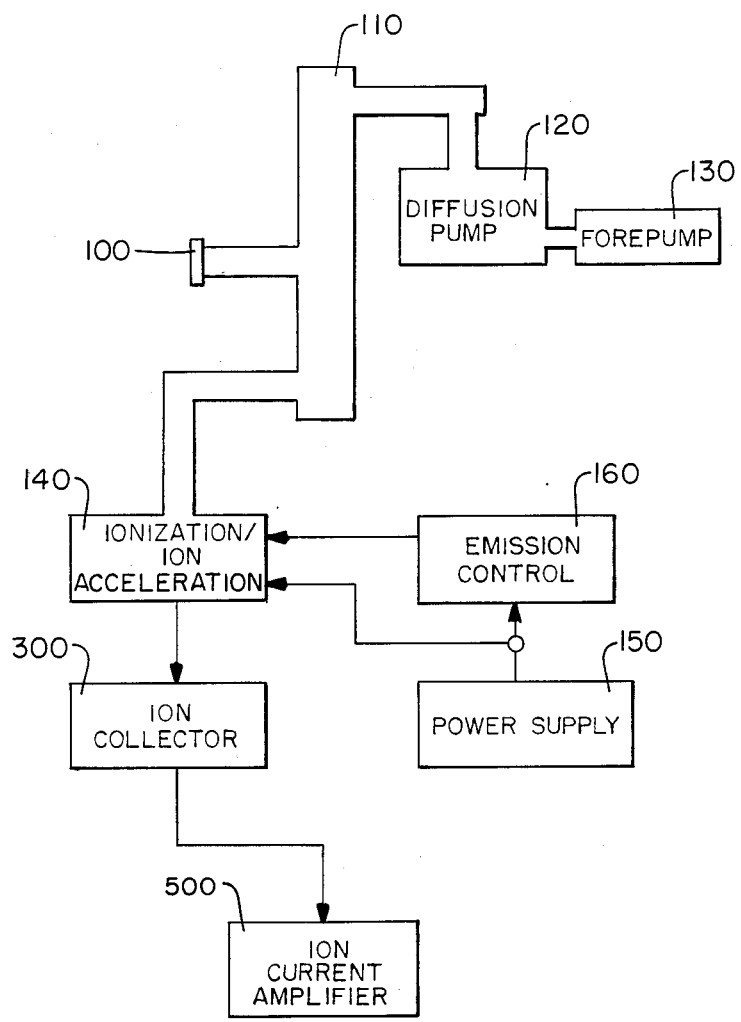
FIG. 2 is a partial schematic diagram of the arrangement of FIG. 1.

Referring now to the drawings, and especially to FIG. 1, operation of the commercially available fixed-focus mass leak detector, DuPont Company Model 120 SSA employing a Diatron-4 analyzing unit will be explained. Further explanation and theory of operation is covered in the instruction manual written for the leak detector, which is available from the manufacturer. The gas which is to be inspected for the presence of helium, is drawn through sample inlet flange 100, a series of valves and traps not shown in FIG. 1, a manifold assembly 110, arriving at a diffusion pump 120 and a forepump 130. The leak detector system can be evacuated to approximately $5 \times 10^{-7}$ torr. As gas is drawn from inlet to pump, it diffuses throughout manifold 110, and enters mass analyzer assembly 140 which contains, for example, the commercially available unit from the DuPont Company, Model Diatron-4. Analyzer 140 is a combined ion source and 180° focussing, fixed-focus mass spectrometer analyzer of the type generally used for the analyses of complex mixtures of gasses, and is specifically designed for the detection of a single gas component having a predetermined mass value. Analyzer 140 draws in a small amount of the gas entering inlet 100, ionizes the gas, and sorts the resulting ions according to their mass. Only a single gas component, having a predetermined mass value, is brought into register, and is the only component producing a readable current in the collector portion of the analyzer. FIG. 2 is a partial block diagram of the arrangement of FIG. 1, which shows the analyzer unit 140, an electrical power supply 150 for the analyzer and an associated emission control unit 160, all of which are commercially available from the DuPont Company.

Figure 3:
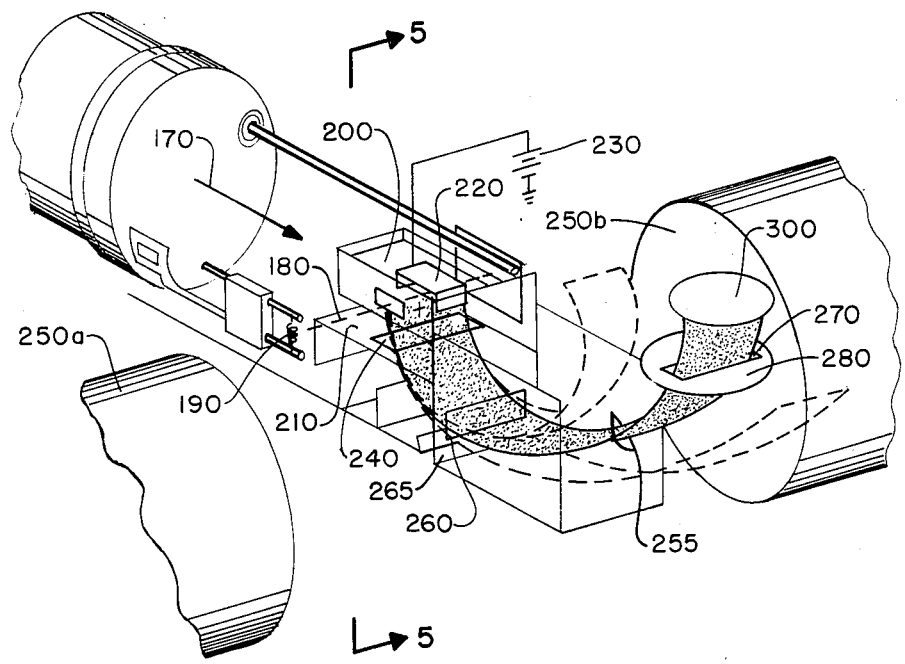
FIG. 3 is a perspective view showing the mass analyzer portion of FIGS. 1 and 2 in greater detail.
Figure 4:
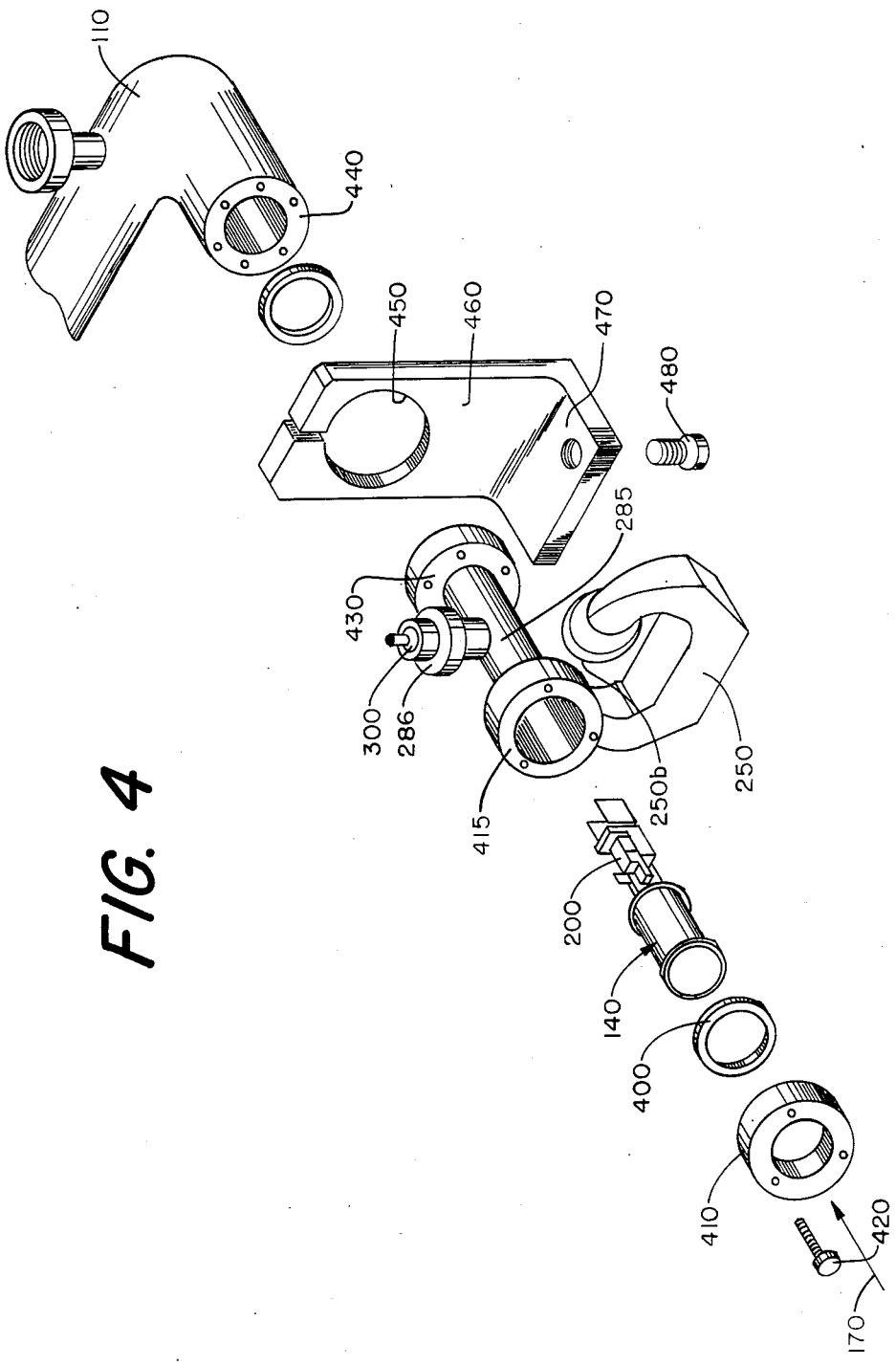
FIG. 4 is an exploded view of the mass analyzer of FIG. 3.

The Diatron -4 portion of the Analyzer 140 is shown in greater detail in the partial perspective view of FIG. 3 and the exploded perspective view of FIG. 4, which are taken from the Instruction Manual for the DuPont Company Model 120 SSA leak detector. As previously mentioned, gas molecules enter the leak detector at inlet 100 and diffuse quickly throughout the entire manifold 110. Those gas molecules that enter analyzer 140 (i.e. in the direction indicated by arrow 170) are bombarded by a beam of electrons 180 which are generated by filament 190. Electron bombardment produces ionized species of the input gas, including ions of the whole molecule as well as molecule fragments and ions of differing electrical charges. A particle accelerator 200 located adjacent the electron beam comprises a grounded plate 210 and a plate 220 which is driven by a positive ion accelerating voltage source 230. The potential difference between plates 210, 220 comprises an ion accelerating voltage which forces all positively charged ions toward an opening or slit 240 formed in plate 210.

Pole pieces 250a, 250b of a magnet 250 set up a magnetic field which intersects the ion path, bending the beam 255 of accelerated ions which pass through slit 240. The interaction of the moving positively charged ions and the magnetic field of magnet 250 force the ions in a circular path having a radius as determined by the aforementioned equation. An intermediate slit 260 formed in baffle plate 265 and a resolving slit 270 formed in baffle plate 280 provide further collimation or selection of the ion beam. Accelerated ions of the design mass value follow a beam path which passes through all collimating slits and arrives at ion collector 300 where the positive ions ultimately return through a direct current, ion-current amplifier. The combination of resolving slit 270 and collector 300 produces an active collecting area of approximately 3/64 square inches.

In this type of detection instrument, and in other short path length instruments of this type, the arrangement and position of the collimating slits are accurately determined so as to provide a selective discrimination against all accelerated ions having a mass differing greatly from that of the design mass. Although the complete housing is not shown in FIG. 3 for purposes of clarity, all baffle plates containing the collimating slits are fixedly attached to a rigid housing and are not relocatable without reconstructing the leak detector housing (such reconstruction is beyond the scope of this invention). In FIG. 4 , the housing can be seen as an envelope member 285, having an upper portion 286 within which the collector 300 is housed.

Referring to the exploded view of FIG. 4, envelope 285 comprises a rigid housing having internal baffles which are not shown in this figure, but are indicated in FIG. 3. After insertion of analyzer unit 140 within envelope 285, a gasket 400 and a collar 410 are attached to flange 415 envelope 285 with a series of bolts 420, thereby securing analyzer unit 140 with respect to the baffle arrangement and the ion target collector. The opposite end of envelope of 285 contains a flange 430 which is bolted to end portion 440 of vacuum manifold 110. Flange 430 is received within the split collar opening 450 of hanger bracket 460. Hanger bracket 460 includes a lower horizontal shelf 470 upon which magnet 250 is placed and secured with bolts 480. Envelope 285 and manifold 110 are connected together to form a rigid suspension member upon which magnet hanger 460 and magnet 250 are rotatably mounted. The split ring arrangement allows rotation of the magnetic field of magnet 250 relative to analyzer 140, to thereby provide critical internal alignment of the ion path with respect to the baffles internal to envelope 285. This rotational positioning is provided to align and shape the rectangular cross-sectioned ion beam 255 relative to the rectangular cross-sectioned beam path formed by the aforementioned baffle arrangement.

It is to be noted that magnet 250, while being mounted for rotation about an axis of envelope 285, is not capable of being displaced in directions perpendicular to that axis. This fixed radial positioning of magnet 250 with respect to the ion path is provided to insure that the ion path does not impinge upon and thereby erode the accelerating electrodes of analyzer 140. This positioning also insures that the ion beam successfully negotiates the ion path formed within envelope 285, with ions striking the collector or detector target 300, being converted into an ion current which is processed by an ion current amplifier 500 indicated in the schematic of FIG. 2.

It is essential to successful operation of the gas-leak detector that a minimum measurable ion rate be collected at the particle detector. This parameter, termed the "ion collection rate" or "collection rate" must, in practical instruments, be at least as great as $10^{-15}$ amperes. This parameter is somewhat related to the "sensitivity" of the gas-leak detector, which, as in any mass spectrometer, is correlated to the smallest number of gas molecules that can be detected. Leak detector sensitivity is specified as the smallest detectable helium concentration in air at a specified source pressure, or alternatively leak detector sensitivity is specified as the smallest, pure helium flow which can be detected at a specified pumping speed at the analyzer unit, within specified test conditions. This latter specification is obtained by measuring the smallest helium leak rate that will give a readable output in the instrument.

Figure 5:
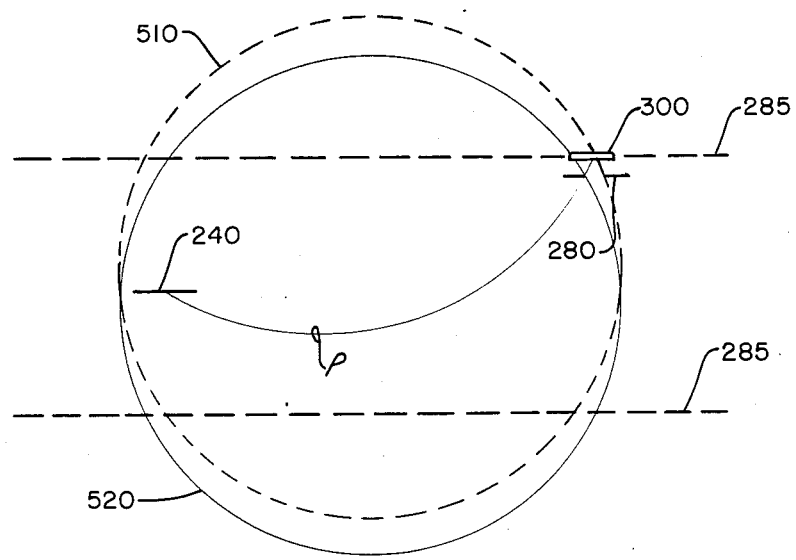
FIG. 5 is a section view taken along the lines 5—5 of FIG. 3, showing alignment of the magnetic deflection field according to the invention.

In the preferred embodiment, conversion from helium (mass-4) to neon (mass-20) detection was achieved in part by replacing the 2300 gauss magnet 250 of the aforementioned arrangement with a less-than-optimum-strength 3900 gauss magnet, and by decreasing the acceleration voltage of source 230 to approximately 45 volts as computed using the aforementioned equation. This modification alone was totally insufficient to provide a usable detection rate at collector 300. No amount of customary adjustment improved the collection rate. According to the present invention, the magnet is readjusted such that the upper non-linear fringe area of the magnetic field, i.e., the area where the magnetic lines of force are non-parallel, is repositioned so as to intersect the ion path. In the preferred embodiment, the magnet pole piece was lowered approximately ⅛ inch. Owing to the non-parallel configuration of the magnetic field interacting with the beam path, the curvature of the final portion of the ion path is altered, and is no longer circular. This change in path shape is sufficient to guide the heretofore blocked beam to the collector 300, and to provide a measured sensitivity for neon of $1.1 \times 10^{-9}$ atm/cc/sec/div. Lowering of the magnet is achieved by replacing the existing hanger (which is rotatable with respect to the beam path, but is fixed in the vertical direction). A replacement hanger allows the magnet pole pieces to be lowered approximately ⅛ inch from its normal position. For purposes of comparison, the magnet is lowered approximtely 20% of the path radius. As can be seen in FIG. 5, while the radius of path P remains unaltered, the final portion of the path, immediately upstream of collector 300 is now located in the non-linear fringe area of the magnetic field. The dashed circle 510 shows the original position of magnet pole piece 250, while solid circle 520 shows the lowered magnet position. The final downstream portion of path P can be seen to lie beyond circle 520, in a region of nonlinear magnetic field. This causes the final portion of the beam to depart from a circular shape, assuming a path shape of greater concavity.

The instrument was calibrated by retaining the replacement magnet hanger, but installing the original magnet (2300 gauss) calibrated for helium (mass-4). After aligning the instrument in a conventional manner, the original design magnet is replaced with the higher field strength magnet, and the magnet shelf is lowered so as to offset the magnetic field relative to the ion path. Tuning for detection of neon is accomplished by performing the following steps in the leak detector amplifier section. First, the "multiplier switch" of the leak detector is set to "on scale ($\times 10$, $\times 50$). Next, the "pressure-ionizing currentaccelerating voltage" switch is set to "ionizing current," and the "high ionizing current" control is set to one-fourth of full scale. After setting the aforementioned switch to "accelerating voltage" the accelerating voltage is adjusted to two volts above a minimum value (approximately 47 volts). With the application of a standard neon leak to the instrument, this setting should provide a maximum number of output divisions as indicated on the instruments output meter. Lastly, a neon standard leak is applied to the instrument, and the sensitivity is verified by taking the ratio of standard leak size to the difference of response divisions, minus background divisions, as indicated on the instruments output meter.

The embodiment of the invention in which an exclusive property or privilege is claimed are defined as follows:

1. A mass-spectrometer type of leak detector for detecting gaseous atoms of a predetermined mass comprising:
   a rigid housing;
   an ion-detecting target means having an active detecting area;
   ionization means for ionizing said atoms to produce ions;
   accelerating means for accelerating said ions in a first direction;
   path defining means comprising a series of spaced apart baffles fixed to said housing and disposed along said path to define the boundary of said path, and to deflect ions which cross said boundary of said path;
   deflecting means comprising a magnet with generally opposed spaced apart pole pieces for generating a magnetic field having a first portion with generally parallel lines of force between the pole pieces and a fringe area portion with generally non-parallel lines of force outside the pole pieces; and
   means for positioning said deflecting means with respect to said rigid housing, accelerating means and ion-detection target means such that a magnetic field generated by such deflection means orthogonally intersects the ion path for deflecting said ions away from said first direction so as to form a concave path of ions extending from said accelerating means through said baffles and to said active collecting area of said ion-detecting target means with substantially the entire concave ion path being in said magnetic field and with a major portion of said concave ion path being in the first portion of said magnetic field and the remaining portion of said concave ion path and said active collecting area of said ion-detecting target means being in said fringe area portion of said magnetic field.

2. A leak detector as in claim 1 wherein said concave ion path is no longer than twelve centimenters, and said ion-detecting target means has an active detecting area no greater than 1/16 square inches.

3. A leak detector as in claim 2 wherein said deflecting means comprises a permanent magnet having a magnetic field strength of approximately 3900 gauss and said accelerating means has an accelerator voltage of approximately 47 volts and said leak detector can be used to collect ions of gaseous atoms having a mass of 20 mass units.

4. The leak detector of claim 2 wherein said baffles comprise a series of spaced-apart ion deflecting plates, each having an aperture located therein to allow the passage of accelerated ions therethrough, said apertures aligned in registry along said path so as to form spaced-apart discrete boundaries of said ion path.

5. A leak detector as in claim 2 wherein said positioning means is adjustable for positioning said deflecting means in a second position with respect to said rigid housing, accelerating means and ion-detecting target means with substantially the entire said concave ion path being in the first portion of said magnetic field, and wherein said leak detector can be used to collect gaseous ions of a different predetermined mass by varying at least one of the magnetic field strength and accelerating means voltage according to the formula $$r = \frac{K}{B} \times \sqrt{\frac{mv}{e}}.$$

6. A leak detector as in claim 5 wherein said concave ion path is no longer than twelve centimeters, said ion-detecting target means has an active detecting area no greater than 1/16 square inches, and wherein said detector when positioned in said second position can be used to collect ions of gaseous atoms having a mass of 4 mass units by utilizing deflecting means with a magnetic field strength of appoxrimately 2300 gauss.

7. A mass-spectrometer type of leak detector for detecting gaseous atoms of predetermined masses comprising:
   a rigid housing;
   an ion-detecting target means having an active detecting area no greater than 1/16 square inches;
   ioniation means for ionizing said atoms to produce ions;
   accelerating means for accelerating said ions in a first direction;
   path defining means comprising a series of spaced apart baffles fixed to said housing and disposed along said path to define the boundary of said path, and to deflect ions which cross said boundary of said path;
   deflecting means comprising a magnet with generally opposed spaced apart pole pieces for generating a magnetic field having a first portion with generally parallel lines of force between the pole pieces and a fringe area portion with generally non-parallel lines of force outside the pole pieces;
   adjustable means for positioning said deflecting means with respect to said rigid housing, accelerating means and ion-detecting target means in first and second positions, respectively, wherein in each of said first and second positions a magnetic field generated by such deflection means orthogonally intersects the ion path for deflecting said ions away from said first direction so as to form a concave path of ions no longer than twelve centimeters extending from said accelerating means through said baffle means and terminating at said active collecting area of said ion-detecting target means, and wherein in said first position of said deflecting means a major portion of said concave ion path being in the first portion of said magnetic field and the remaining portion of said concave ion path and said active detecting area being in said fringe area portion of said magnetic field, and wherein said second position of said deflecting means, substantially the entire said concave ion path being in said first portion of said magnetic field, whereby said leak detector can be used to collect gaseous ions having a mass of 20 mass units in said first position of said deflecting means by utilizing one set of magnetic field strength and accelerating voltage, and wherein said leak detector can be used to collect gaseous ions having a mass of 4 mass units in said second position of said deflecting means by utilizing a second set of magnetic field strength and accelerating voltage with each said set of magnetic field strength and accelerating voltage corresponding to the formula $$r = \frac{K}{B} \times \sqrt{\frac{mv}{e}}.$$

8. The leak detector of claim 7 wherein said baffles comprise a series of spaced-apart ion deflecting plates, each having an aperture located therein to allow the passage of accelerated ions therethrough, said apertures aligned in registry along said path so as to form spaced-apart discrete boundaries of said ion path.

* * * * *